(12) United States Patent
Ohtani

(10) Patent No.: US 7,813,647 B2
(45) Date of Patent: Oct. 12, 2010

(54) CHROMATIC DISPERSION COMPENSATION CONTROL METHOD AND APPARATUS

(75) Inventor: Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 11/987,900

(22) Filed: Dec. 5, 2007

(65) Prior Publication Data

US 2008/0089695 A1 Apr. 17, 2008

Related U.S. Application Data

(63) Continuation of application No. PCT/JP2005/011496, filed on Jun. 23, 2005.

(51) Int. Cl.
    *H04B 10/12* (2006.01)
(52) U.S. Cl. .................. 398/147; 398/81; 398/158; 398/159
(58) Field of Classification Search ............. 398/147, 398/148, 149, 158, 159, 79, 81, 33, 202, 398/208, 209, 213, 214, 30, 31, 192, 193, 398/194, 182, 183, 186, 154, 155, 162, 135, 398/136, 137, 138, 139
See application file for complete search history.

(56) References Cited

U.S. PATENT DOCUMENTS

| | | | | |
|---|---|---|---|---|
| 7,536,108 | B2 * | 5/2009 | Hirano et al. | 398/147 |
| 2002/0048062 | A1 * | 4/2002 | Sakamoto et al. | 359/124 |
| 2002/0089724 | A1 | 7/2002 | Nishimoto et al. | |
| 2003/0081292 | A1 * | 5/2003 | Mikami et al. | 359/161 |
| 2003/0223760 | A1 * | 12/2003 | Takahara et al. | 398/147 |

FOREIGN PATENT DOCUMENTS

| | | |
|---|---|---|
| JP | 2002-208892 | 7/2002 |
| JP | 2003-244175 | 8/2003 |
| JP | 2003-348039 | 12/2003 |
| JP | 2004-304559 | 10/2004 |

OTHER PUBLICATIONS

International Search Report (PCT/ISA/210) mailed Jul. 26, 2005 for International Application PCT/JP2005/011496.

* cited by examiner

*Primary Examiner*—Hanh Phan
(74) *Attorney, Agent, or Firm*—Staas & Halsey LLP

(57) ABSTRACT

A chromatic dispersion compensation control method for compensating the chromatic dispersion of an optical transmission path with a variable dispersion compensator inserted in the optical transmission path is disclosed. The method includes a transmitter inserting a fixed data sequence in the rewritable area of a transmission data sequence to be transmitted and transmitting the transmission data sequence to the optical transmission path, the fixed data sequence containing alternating 0-1 data formed of alternating 0s and 1s and alternating 0 series-1 series data formed of alternating series of 0s and 1s; and a receiver determining a direction to increase or decrease the dispersion compensation of the variable dispersion compensator based on the number of error occurrences in the alternating 0-1 data and the number of error occurrences in the alternating 0 series-1 series data, and variably controlling the dispersion compensation of the variable dispersion compensator in accordance with the determined direction.

20 Claims, 15 Drawing Sheets

CHROMATIC DISPERSION COMPENSATION CONTROL METHOD AND APPARATUS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2005/011496, filed on Jun. 23, 2005, the entire contents of which are hereby incorporated by reference.

BACKGROUND OF THE INVENTION

1. Field of the Invention

The present invention relates generally to chromatic dispersion compensation control methods and apparatuses, and more particularly to a chromatic dispersion compensation control method and apparatus that compensate for the chromatic dispersion of an optical transmission path using a tunable dispersion compensator.

2. Description of the Related Art

In a long distance optical transmission system, the waveforms of light signal pulses are degraded or deformed by transmission due to the chromatic dispersion of an optical fiber that is a transmission path.

FIG. 1 is a diagram for illustrating intersymbol interference according to bit rates.

Referring to FIG. 1, the effect of waveform degradation is limited in a low bit rate (for example, 2.5 Gbps) optical transmission system. However, in a high bit rate (for example, 10 Gbps) optical transmission system where the pulse width of data is reduced, the effect of intersymbol interference is conspicuous due to waveform degradation, thus causing the degradation of error characteristics.

FIG. 2 is a diagram for illustrating a conventional chromatic dispersion compensation control method.

In the existing 10G optical transmission system, it is predominant to insert a dispersion compensation fiber opposite in characteristics to an optical fiber transmission path 1 as a dispersion compensator 2 in the transmission path 1 between a transmitter 4 and a receiver 3 in order to correct waveform degradation. However, it is necessary to prepare dispersion compensation fibers having different lengths as the dispersion compensator 2 depending on the length (distance) of the transmission path 1. Accordingly, tunable dispersion modules have also been used recently as the dispersion compensator 2 in place of dispersion compensation fibers.

The amount of control of the dispersion compensator 2 is set to an optimum value depending on the type of transmission path fiber, such as SMF (Single Mode Fiber), NZDSF (Non-Zero Dispersion Shifted Fiber), or DSF (Dispersion Shifted Fiber), and its transmission distance. In response to subsequent changes over time in the fiber characteristics or subsequent replacement of the transmission path fiber, the dispersion compensator 2 should be adjusted during its operation in order to maintain transmission quality.

FIG. 3 is a block diagram showing a dispersion control method of a conventional tunable dispersion compensator. FIG. 4 is a flowchart showing the dispersion control method of the conventional tunable dispersion compensator.

In the case of using a tunable dispersion compensator as the dispersion compensator 2, according to the dispersion control method of the conventional tunable dispersion compensator, the dispersion compensation is varied in amount in each of the direction to decrease residual dispersion and the direction to increase residual dispersion while monitoring the amount of error in the receiver 3, and the direction in which to control the dispersion compensation is determined based on whether the amount of error tends to increase or decrease as shown in the block diagram of FIG. 3 and the flowchart of FIG. 4.

Japanese Laid-Open Patent Application No. 2004-304559 shows determining whether the dispersion compensation is in the positive or negative direction by comparing the peak value of a received signal with a predetermined threshold.

According to the conventional method shown in FIGS. 3 and 4, the dispersion compensation is varied in each of the direction to decrease residual dispersion and the direction to increase residual dispersion. Therefore, as shown in FIG. 5, in the case of varying the dispersion compensation in the direction to increase residual dispersion from a residual dispersion A, where the error rate is close to an error correctable level threshold (upper limit) TH, there is a problem in that the error rate may exceed the error correctable level threshold TH so that it may not be possible to correct errors so as to temporarily increase errors.

SUMMARY OF THE INVENTION

Embodiments of the present invention may solve or reduce one or more of the above-described problems.

According to one embodiment of the present invention, there is provided a chromatic dispersion compensation control method and apparatus capable of optimally varying the amount of dispersion compensation without concern that varying the amount of dispersion compensation may prevent errors from being corrected.

According to one embodiment of the present invention, there is provided a chromatic dispersion compensation control method compensating for a chromatic dispersion of an optical transmission path with a variable dispersion compensator inserted in the optical transmission path, the chromatic dispersion compensation control method including a transmitter inserting a fixed data sequence in a rewritable area of a transmission data sequence to be transmitted and transmitting the transmission data sequence to the optical transmission path, the fixed data sequence containing alternating 0-1 data formed of alternating 0s and 1s and alternating 0 series-1 series data formed of alternating series of 0s and 1s; and a receiver determining a direction to increase or decrease a dispersion compensation of the variable dispersion compensator based on a number of error occurrences in the alternating 0-1 data of the fixed data sequence and a number of error occurrences in the alternating 0 series-1 series data of the fixed data sequence, and variably controlling the dispersion compensation of the variable dispersion compensator in accordance with the determined direction.

According to one embodiment of the present invention, there is provided a transmitter for use in a chromatic dispersion compensation control method compensating for a chromatic dispersion of an optical transmission path with a variable dispersion compensator inserted in the optical transmission path, the transmitter including a fixed data sequence generating part configured to generate a fixed data sequence containing alternating 0-1 data formed of alternating 0s and 1s and alternating 0 series-1 series data formed of alternating series of 0s and 1s; and a fixed data sequence inserting part configured to insert the fixed data sequence in a rewritable area of a transmission data sequence to be transmitted, and to transmit the transmission data sequence to the optical transmission path.

According to one embodiment of the present invention, there is provided a receiver for use in a chromatic dispersion compensation control method compensating for a chromatic dispersion of an optical transmission path with a variable dispersion compensator inserted in the optical transmission path, the receiver including an alternating 0-1 data error number counting part configured to count a number of error occurrences in alternating 0-1 data of a fixed data sequence inserted in a rewritable area of a transmission data sequence in a transmitter, the fixed data sequence containing the alternating 0-1 data formed of alternating 0s and 1s and alternating 0 series-1 series data formed of alternating series of 0s and 1s; an alternating 0 series-1 series error number counting part configured to count a number of errors in the alternating 0 series-1 series data of the fixed data sequence; an increase/decrease direction determining part configured to determine a direction to increase or decrease a dispersion compensation of the variable dispersion compensator based on the number of error occurrences in the alternating 0-1 data and the number of error occurrences in the alternating 0 series-1 series data; and a control part configured to variably control the dispersion compensation of the variable dispersion compensator in accordance with the determined direction.

According to one embodiment of the present invention, there is provided a transmitter for use in a chromatic dispersion compensation control method compensating for a chromatic dispersion of an optical transmission path with a variable dispersion compensator inserted in the optical transmission path, the transmitter including a fixed data sequence generating part configured to generate a fixed data sequence containing alternating 0-1 data formed of alternating 0s and 1s, alternating 0 series-1 series data formed of alternating series of 0s and 1s, and 0-series data formed of a series of 0s; and a fixed data sequence inserting part configured to insert the fixed data sequence in a rewritable area of a transmission data sequence to be transmitted, and to transmit the transmission data sequence to the optical transmission path.

According to one embodiment of the present invention, there is provided a receiver for use in a chromatic dispersion compensation control method compensating for a chromatic dispersion of an optical transmission path with a variable dispersion compensator inserted in the optical transmission path, the receiver including an alternating 0-1 data error number counting part configured to count a number of error occurrences in an alternating 0-1 data of a fixed data sequence inserted in a rewritable area of a transmission data sequence in a transmitter, the fixed data sequence containing the alternating 0-1 data formed of alternating 0s and 1s, alternating 0 series-1 series data formed of alternating series of 0s and 1s, and 0-series data formed of a series of 0s; an alternating 0 series-1 series error number counting part configured to count a number of errors in the alternating 0 series-1 series data of the fixed data sequence; a 0-series error number counting part configured to count a number of errors in the 0-series data of the fixed data sequence; an increase/decrease direction determining part configured to determine a direction to increase or decrease a dispersion compensation of the variable dispersion compensator based on a value obtained by subtracting a value corresponding to the number of error occurrences in the 0-series data from the number of error occurrences in the alternating 0-1 data and on a value obtained by subtracting the value corresponding to the number of error occurrences in the 0-series data from the number of error occurrences in the alternating 0 series-1 series data; and a control part configured to variably control the dispersion compensation of the variable dispersion compensator in accordance with the determined direction.

Thus, according to embodiments of the present invention, it is possible to optimally vary the amount of dispersion compensation without concern that varying the amount of dispersion compensation may prevent errors from being corrected.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

[Principle of the Present Invention]

Figure 1:
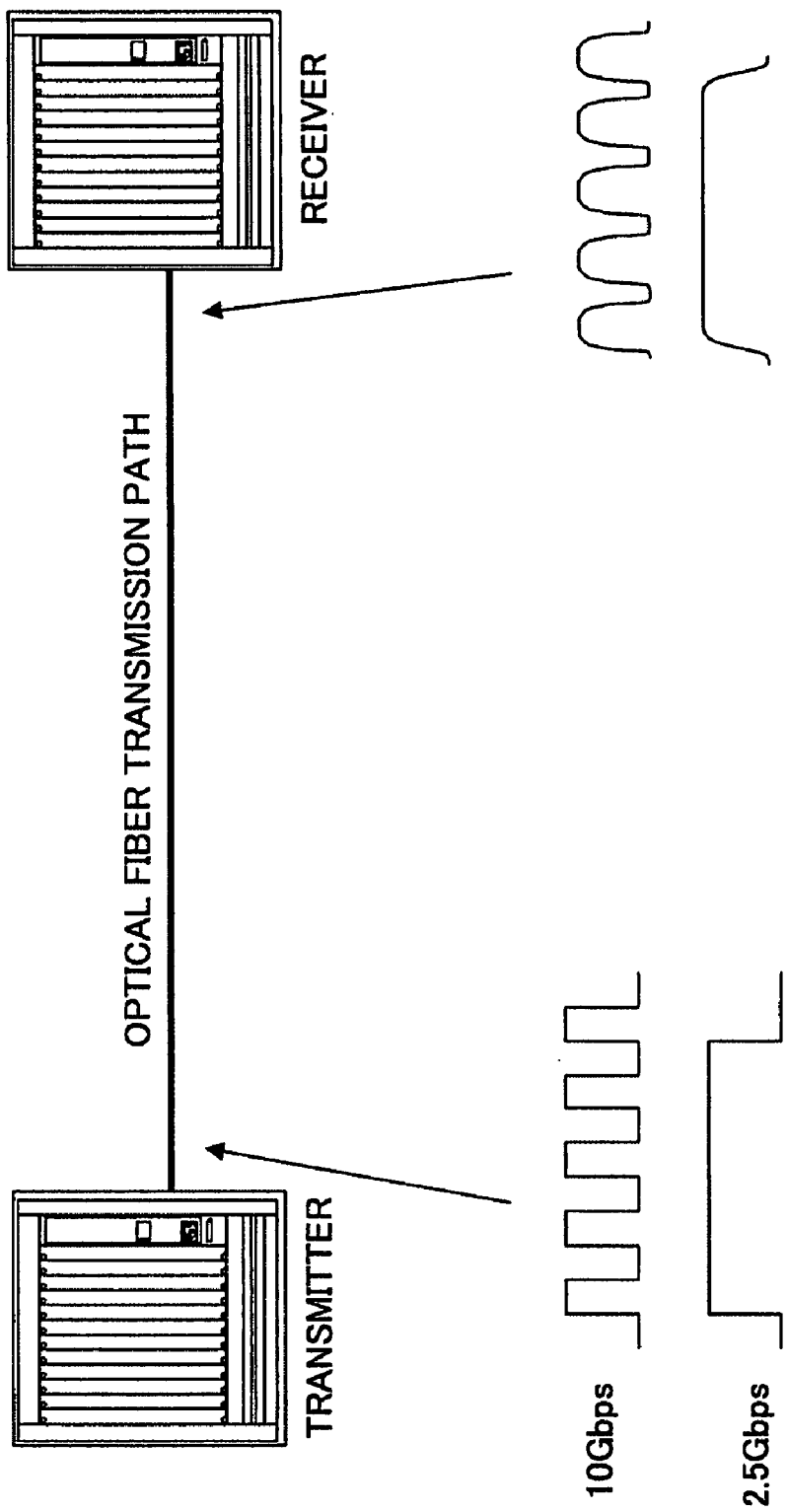
FIG. 1 is a diagram for illustrating intersymbol interference according to bit rates.
Figure 2:
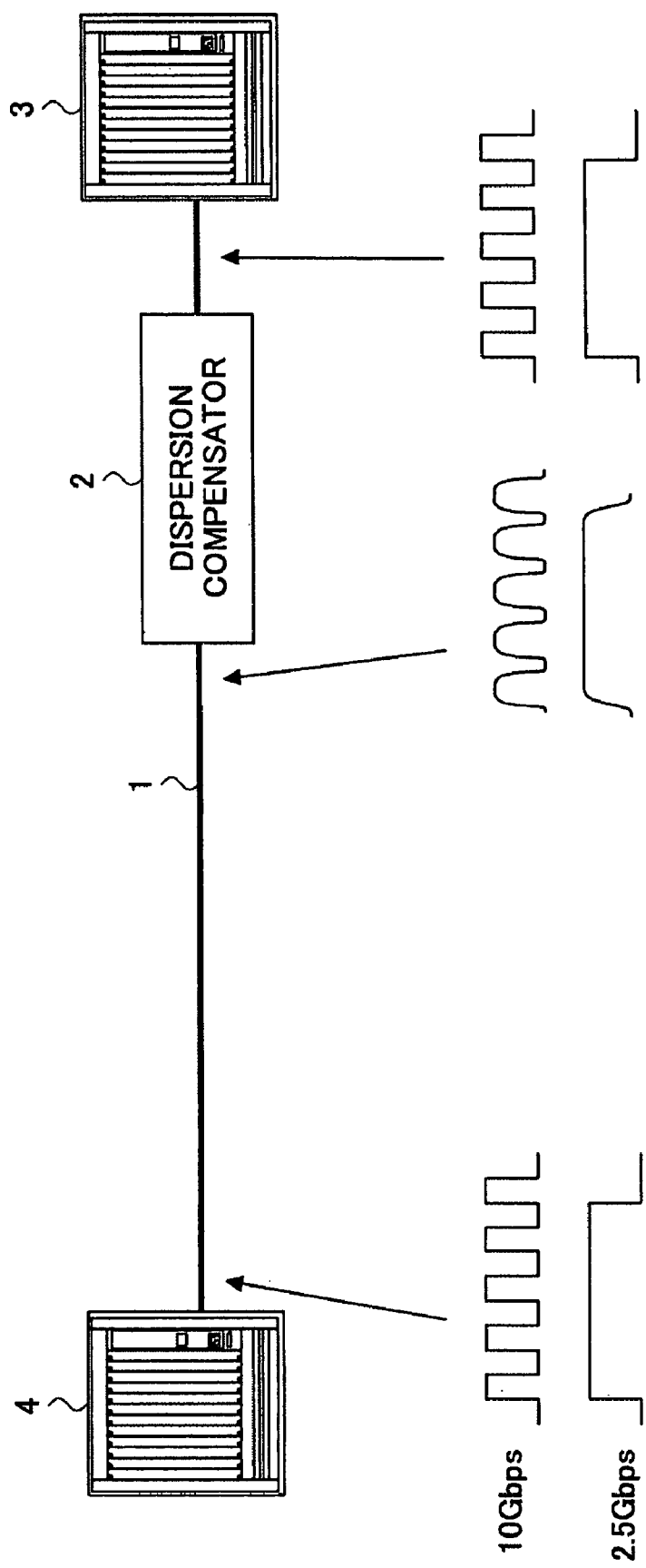
FIG. 2 is a diagram for illustrating a conventional chromatic dispersion compensation control method.
Figure 3:
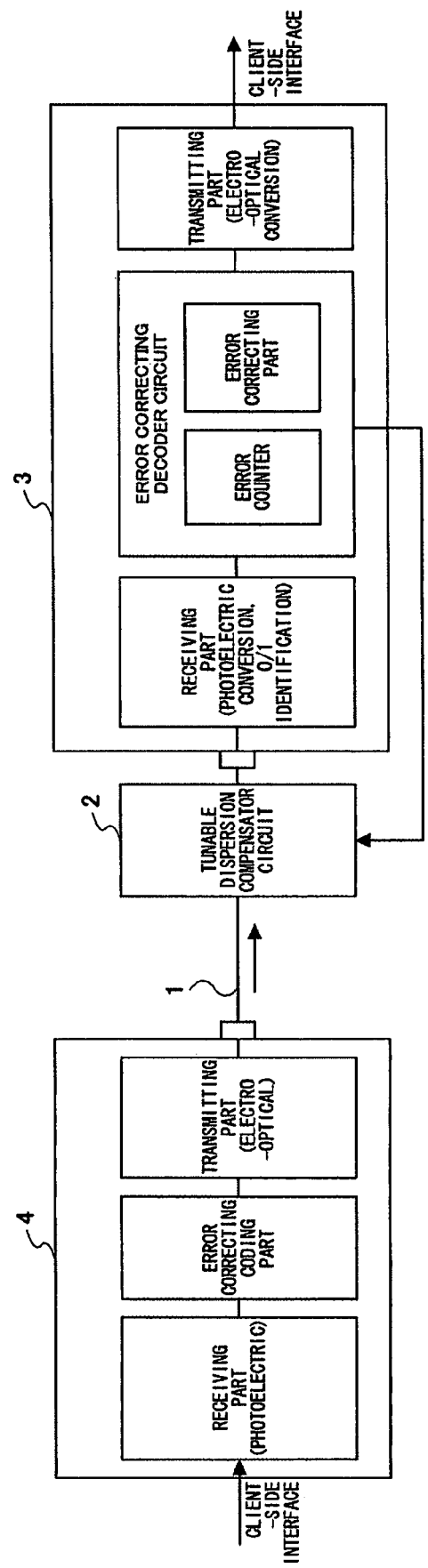
FIG. 3 is a block diagram showing a dispersion control method of a conventional tunable dispersion compensator.
Figure 4:
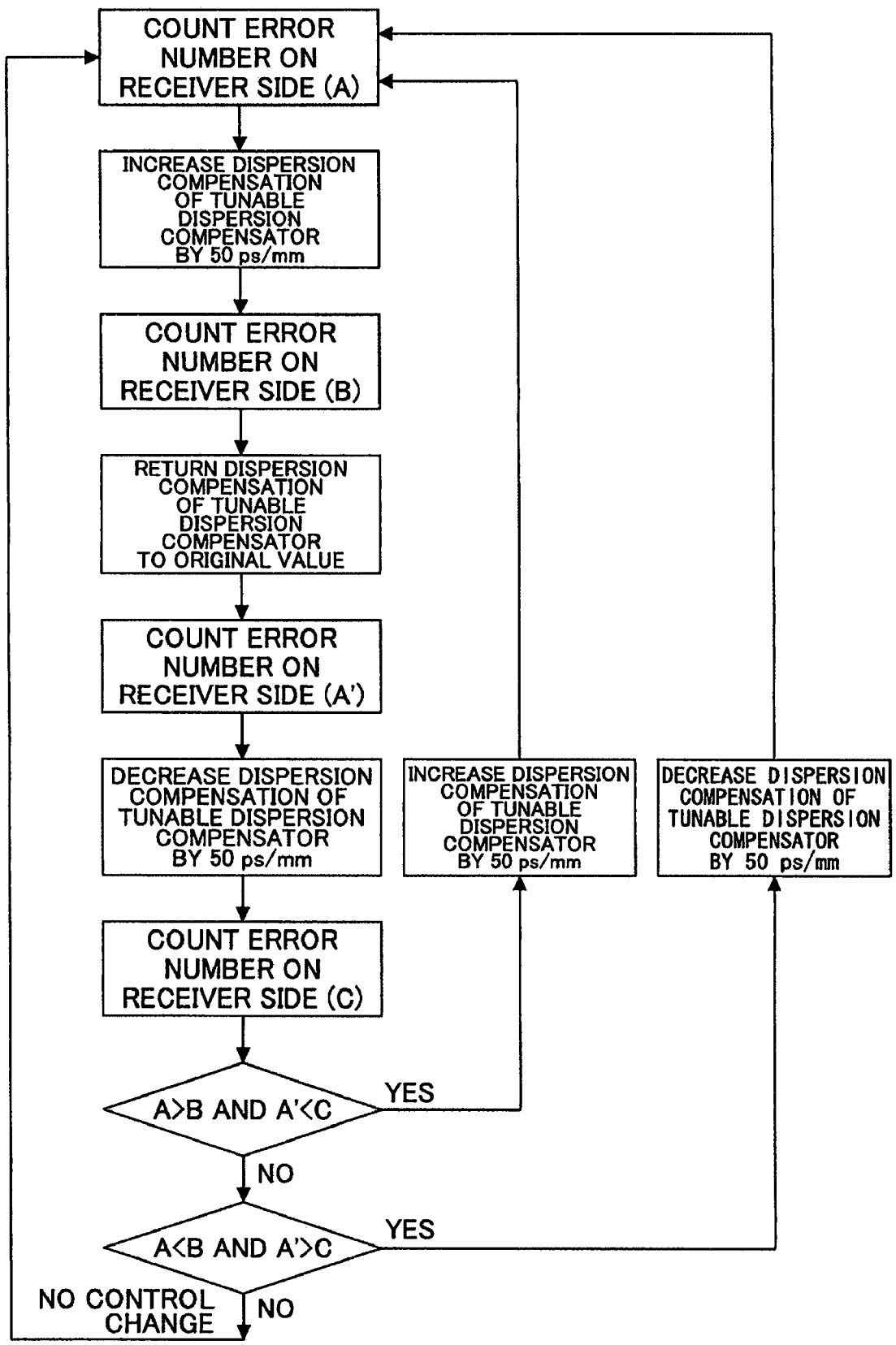
FIG. 4 is a flowchart showing the dispersion control method of the conventional tunable dispersion compensator.
Figure 5:
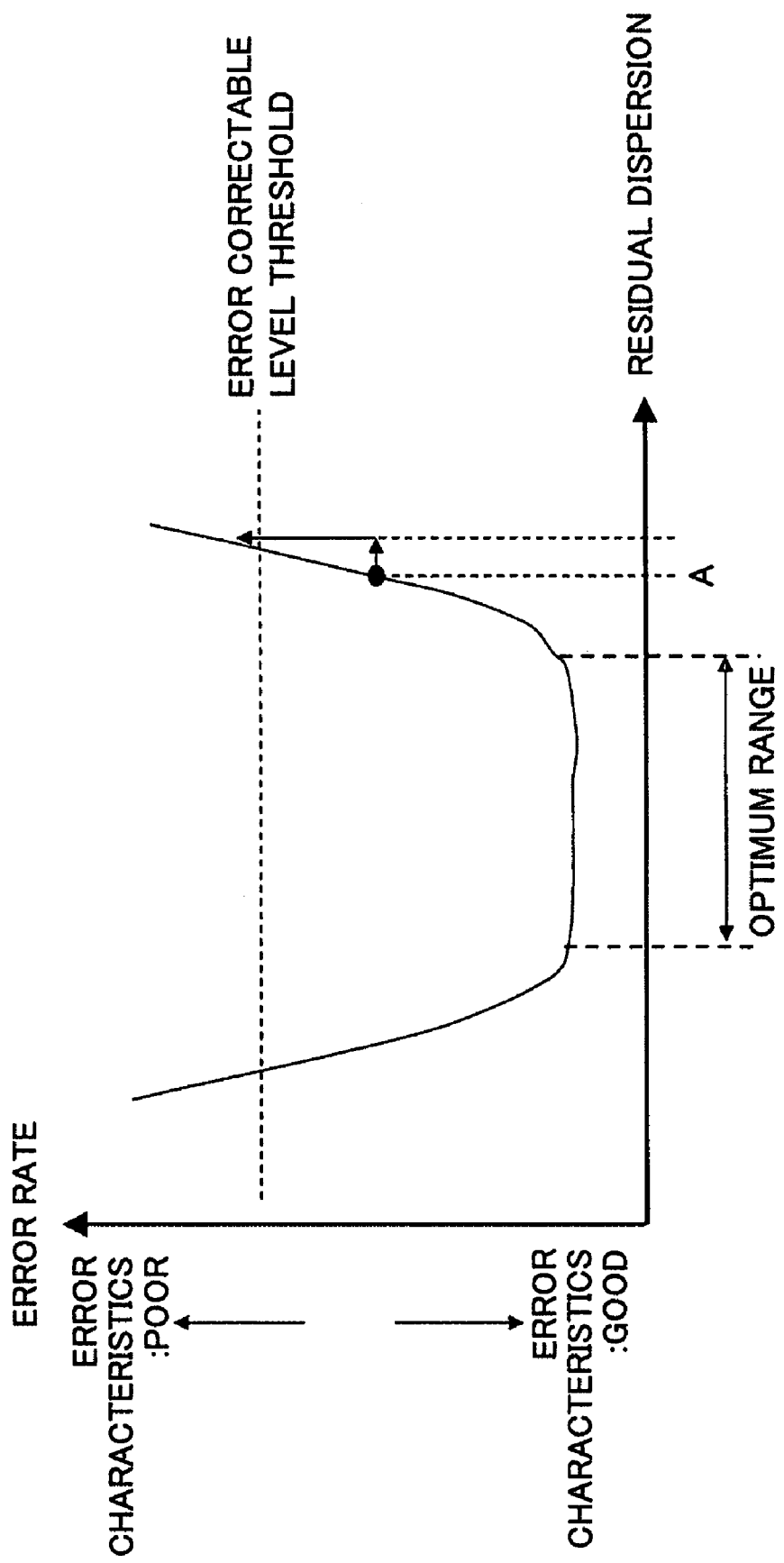
FIG. 5 is a graph showing the relationship between residual dispersion and error rate.
Figure 6:
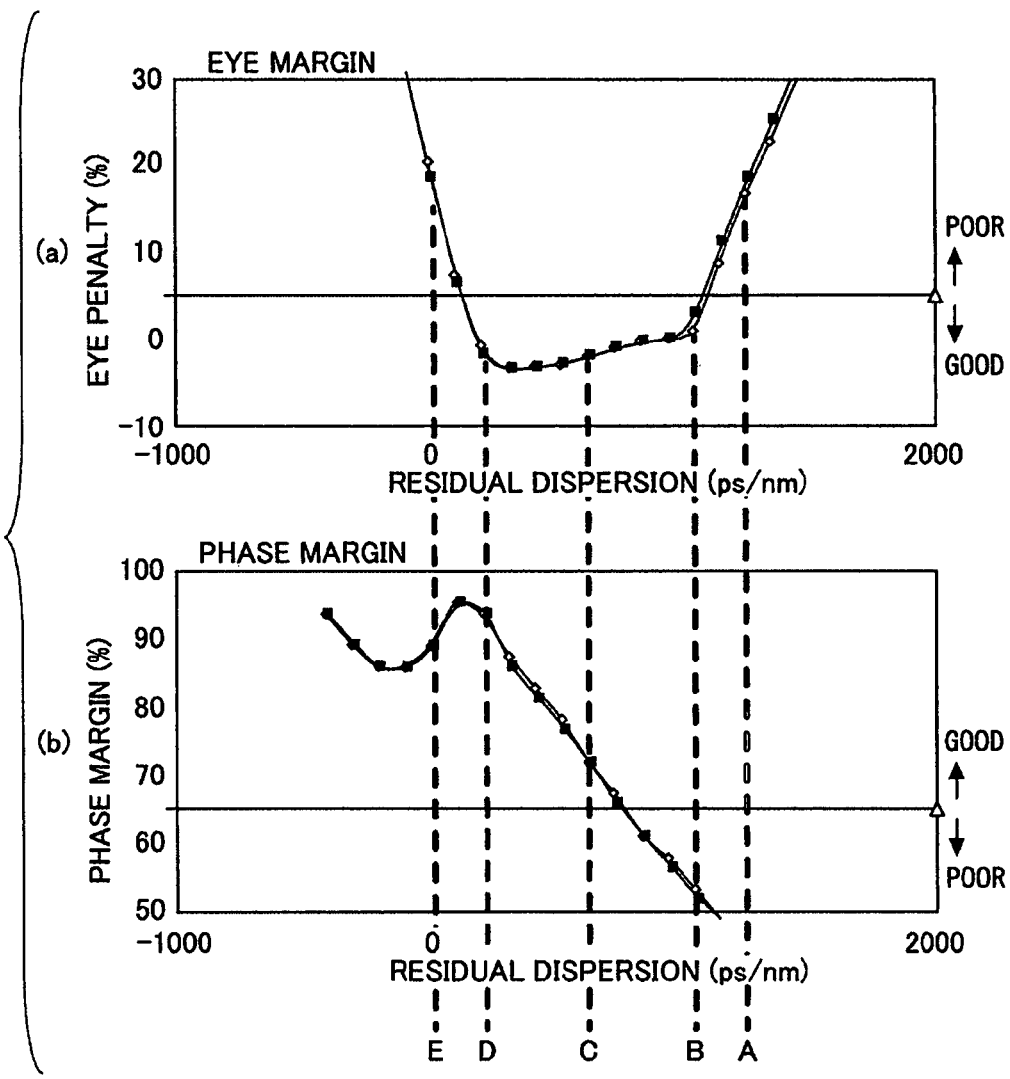
FIG. 6 shows a graph showing the relationship between residual dispersion and eye penalty and a graph showing the relationship between residual dispersion and phase margin.
Figure 7:
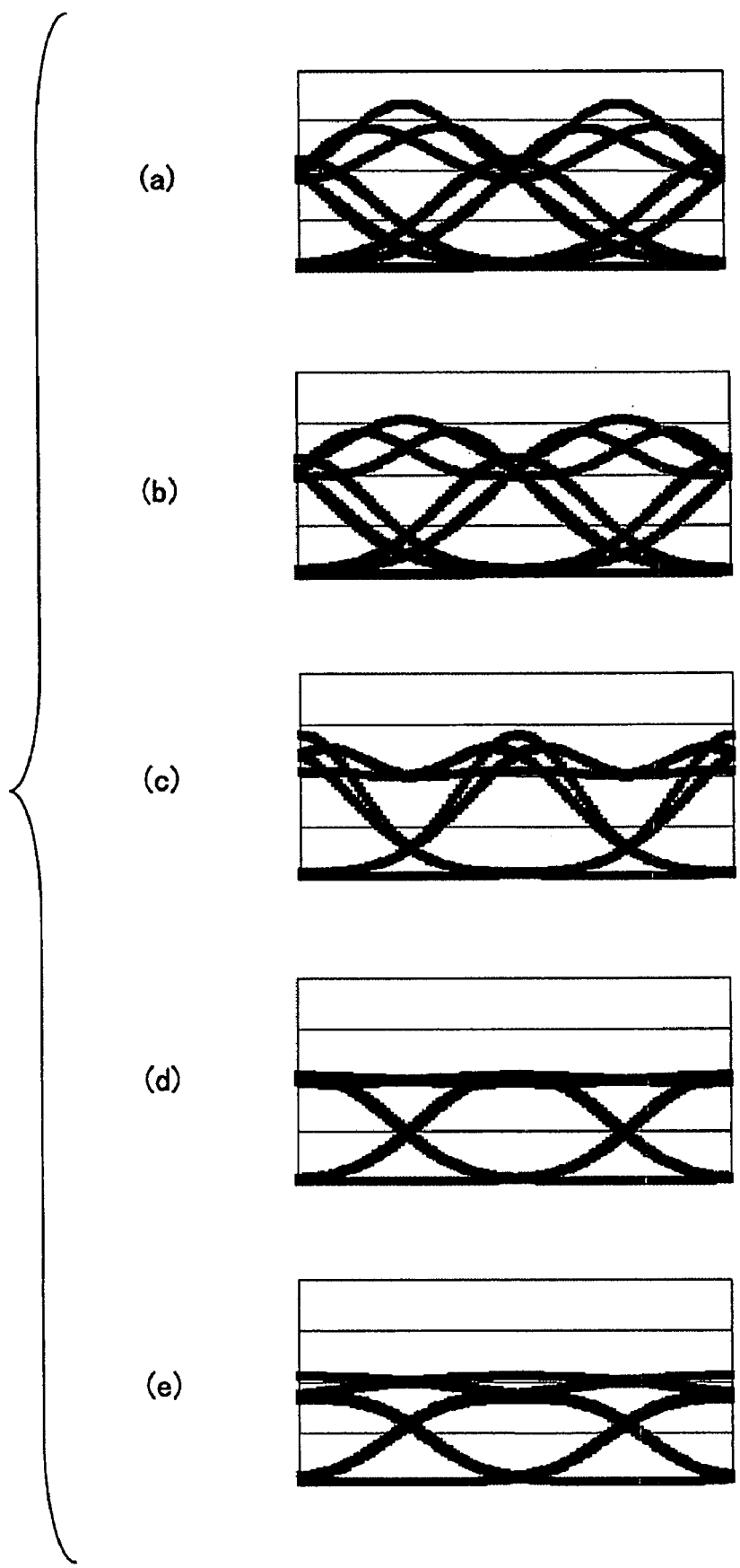
FIG. 7 shows the eye patterns of received waveforms.

Referring to FIG. 6, (a) shows a graph showing the relationship between residual dispersion (=total dispersion in a transmission path−dispersion compensation) and eye penalty, and (b) shows the relationship between residual dispersion and phase margin. Referring to FIG. 7, (a) through (e) show the eye patterns of received waveforms corresponding to Residual Dispersions A through E, respectively, of FIG. 6.

The eye penalty shown in (a) of FIG. 6 indicates the opening of an eye in the directions of amplitude. A 0% eye penalty represents the completely open state of the eye, and a 50% eye penalty represents the half-closed state of the eye. The range of approximately 5% or less is acceptable. Further, the phase margin shown in (b) of FIG. 6 indicates the opening of an eye in the directions of a phase. A 100% phase margin indicates the completely open state of the eye, and a 50% phase margin indicates the half-closed state of the eye. The range of approximately 65% or more is acceptable.

Here, the eye margin has a characteristic shape of substantial bilateral symmetry with respect to Residual Dispersion C. Therefore, the characteristic tends to be degraded both in the case of a large dispersion compensation (that is, a small residual dispersion) and in the case of a small dispersion compensation (that is, a large residual dispersion). On the other hand, the phase margin is not bilaterally symmetrical and tends to be better in characteristic with smaller residual dispersions.

According to one embodiment of the present invention, it is determined, using this characteristic, whether to increase or decrease dispersion compensation in order to optimize the dispersion compensation.

Figure 8:
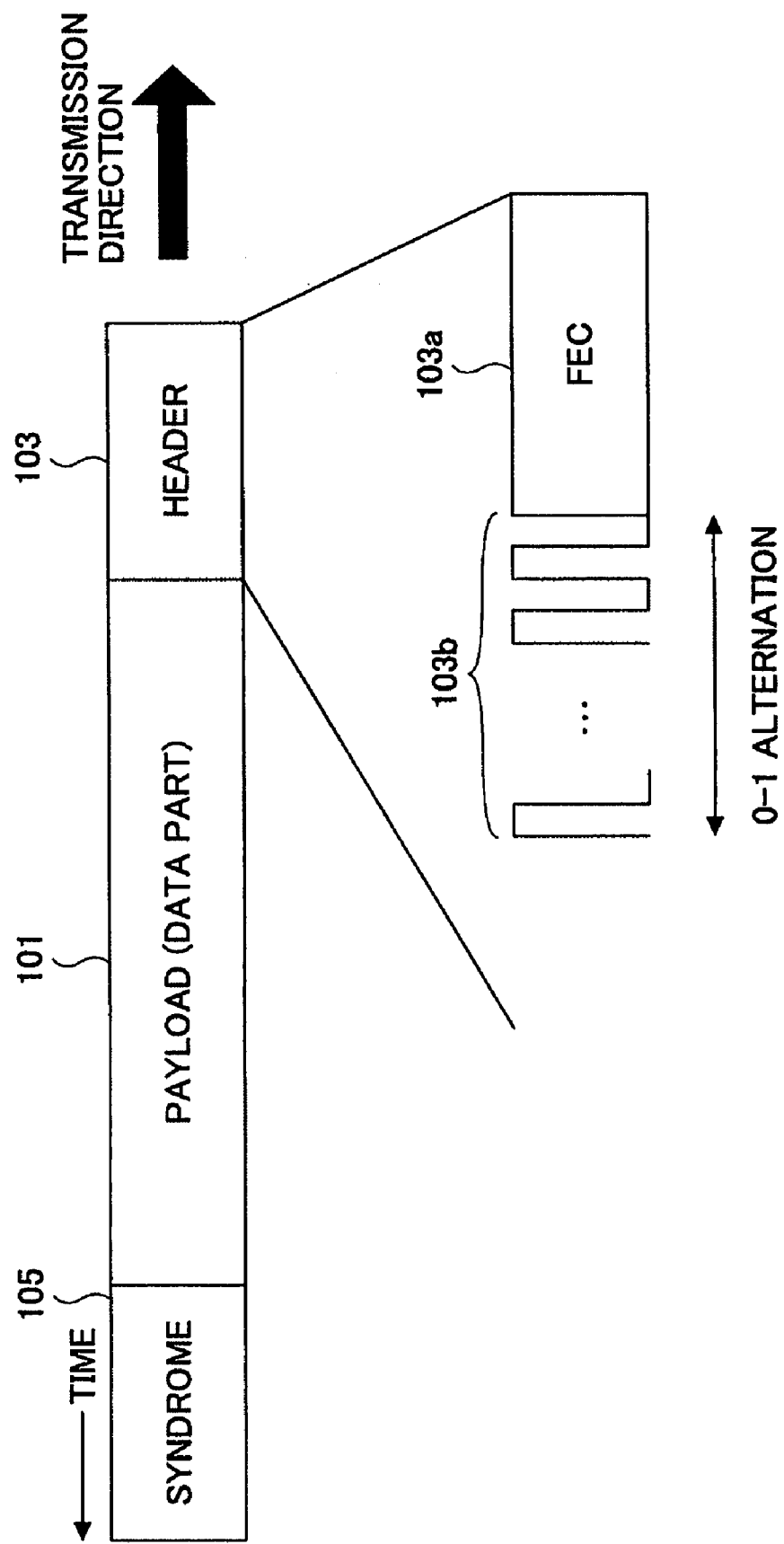
FIG. 8 is a diagram showing a frame configuration according to one embodiment of the present invention.

FIG. 8 is a diagram showing a frame configuration according to one embodiment of the present invention. In the case of 10 Gbps transmission, in the frame configuration (FEC frame) of FIG. 8, a payload (data part) 101 representing the data of a client is transmitted with a header 103 containing FEC (Forward Error Correction) information 103a, and a syndrome 105 added thereto, and a bit error is detected and corrected at the receiver end using the FEC information 103a and the syndrome 105. In addition to the FEC information 103a, the header 103 includes a blank (unused) area 103b that a user can freely use on the apparatus side. According to one embodiment of the present invention, a fixed data sequence is entered (or set) in the blank area 103b of the header 103. Then, at the receiver end, it is determined on which side of an optimum value the residual dispersion is by determining the phase margin and the eye penalty at the receiver end, and the result of this determination is used to perform control.

A low phase margin (meaning difficulty in terms of a phase) indicates that intersymbol interference is likely to occur between adjacent data pulses. Therefore, simple alternating 0-1 data (data of alternating 0s and 1s) is the pattern that is most susceptible to intersymbol interference and causes errors to occur at high rate. Accordingly, as shown in FIG. 8, alternating 0-1 data are written into the blank area 103b of the header 103, which is a user rewritable area, and are transmitted. At the receiver end, the alternating 0-1 data of the area 103b are read before error correction, and it is determined whether to increase or decrease the amount of dispersion compensation by analyzing error occurrence in the alternating 0-1 data.

Figure 9:
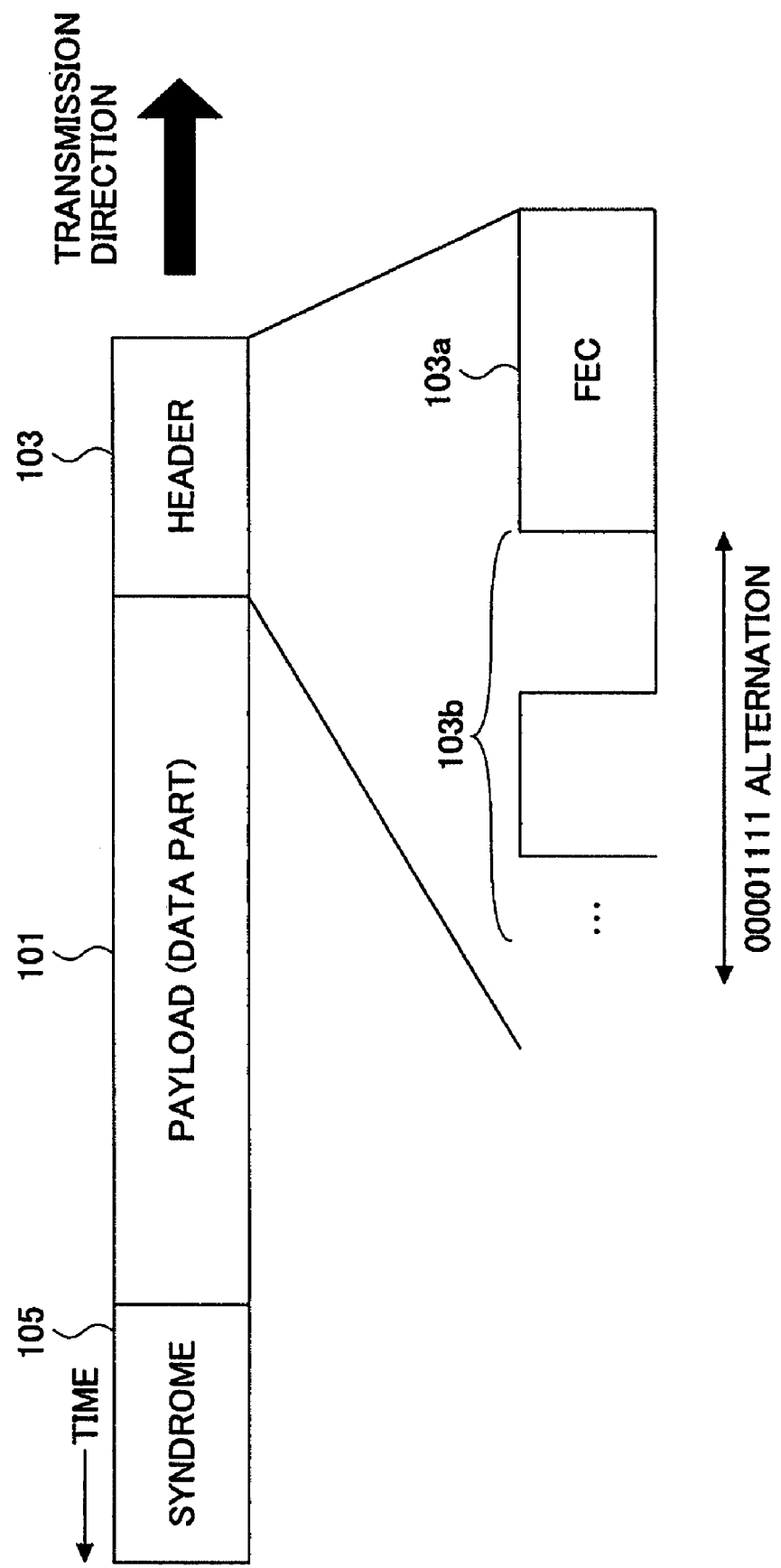
FIG. 9 is a diagram showing a frame configuration according to one embodiment of the present invention.

Further, in the case of an excessively small amount of residual dispersion (that is, an excessively large amount of dispersion compensation), there is no problem with the phase margin, but the degradation of the eye penalty (that is, flattening in the directions of amplitude) causes errors. In this case, as shown in FIG. 9, alternating 0 series-1 series data (data of alternating 0 series [series of 0s] and 1 series [series of 1s]) with less 0-1 variations, such as "0000111100001111 . . . ," are written into the blank area 103b of the header 103, which is a user rewritable area," and are transmitted. The eye penalty can be determined based on the occurrence of error in the 0-series data part and the 1-series data part. Since the change in the amount of dispersion is gradual, the time up to control may be on the order of a second, and the determination is made over multiple frames for accuracy.

Thus, data are transmitted with a specific data sequence inserted therein for determining the amount of dispersion compensation, and it is determined to which side a shift is made from an optimum point of dispersion by checking (or determining) the degree (frequency) of occurrence of errors in the portion of the data where the specific data sequence is inserted.

First Embodiment

Figure 10:
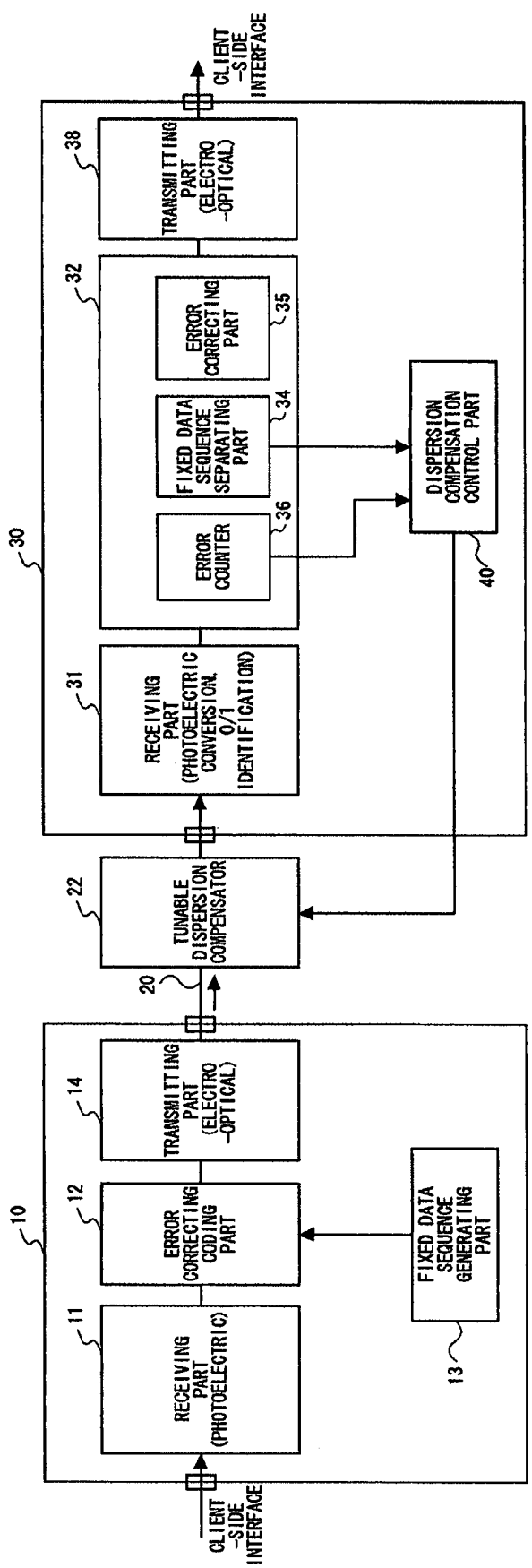
FIG. 10 is a block diagram showing an optical transmission system to which a chromatic dispersion compensation control method is applied according to a first embodiment of the present invention.

FIG. 10 is a block diagram showing an optical transmission system to which a chromatic dispersion compensation control method is applied according to a first embodiment of the present invention.

The optical transmission system of FIG. 10 includes a transmitter 10, a receiver 30, and a transmission path 20 connecting the transmitter 10 and the receiver 30. The optical transmission system of FIG. 10 further includes a tunable (variable) dispersion compensator in the transmission path 20 between the transmitter 10 and the receiver 30.

The transmitter 10 includes a receiving part 11, an error correcting coding part 12 (a fixed data sequence inserting part), a fixed data sequence generating part 13, and a transmitting part 14. The receiving part 11 receives a light signal from a client-side interface, converts the received light signal into an electrical signal, and feeds the electrical signal to the error correcting coding part 12.

The fixed data sequence generating part 13 generates alternating 0-1 data of "01010101" and alternating 0 series-1 series data of "00001111" as fixed data sequences for dispersion determination to be contained in the blank area of a header, and feeds the generated alternating 0-1 data and alternating 0 series-1 series data to the error correcting coding part 12. The number of successive 0s of a 0-series data part forming the alternating 0 series-1 series data and the number of successive is of a 1-series data part forming the alternating 0 series-1 series data are not limited to four and may be any number greater than or equal to two. Further, the number of successive 0s and the number of successive 1s may be different.

Here, by using the alternating 0-1 data and the alternating 0 series-1 series data, it is possible to determine whether the occurrence of error in the data part in the header is an effect in the directions of phase or amplitude from the effect of data portions where 0 changes to 1 or 1 changes to 0 (0-to-1 or 1-to-0 data change portions) on chromatic dispersion.

That is, by changing the number of bits of the 0 series and the 1 series, it is possible to change the number of 0-to-1 or 1-to-0 data change portions that appear per unit time.

For example, if the frequency of occurrence of error does not change even after the number of bits of the 0 series and the 1 series is changed, it is considered that error occurs not only in the 0-to-1 or 1-to-0 data change portions but also in the 0-series or 1-series data portions. Accordingly, it may be determined that the effect in the directions of amplitude is strong.

On the other hand, if the frequency of occurrence of error increases or decreases as a result of changing the number of bits of the 0 series and the 1 series, it is considered that the error corresponds to the number of 0-to-1 or 1-to-0 data change portions, so that it may be determined that the effect of phase is strong.

Figure 11:
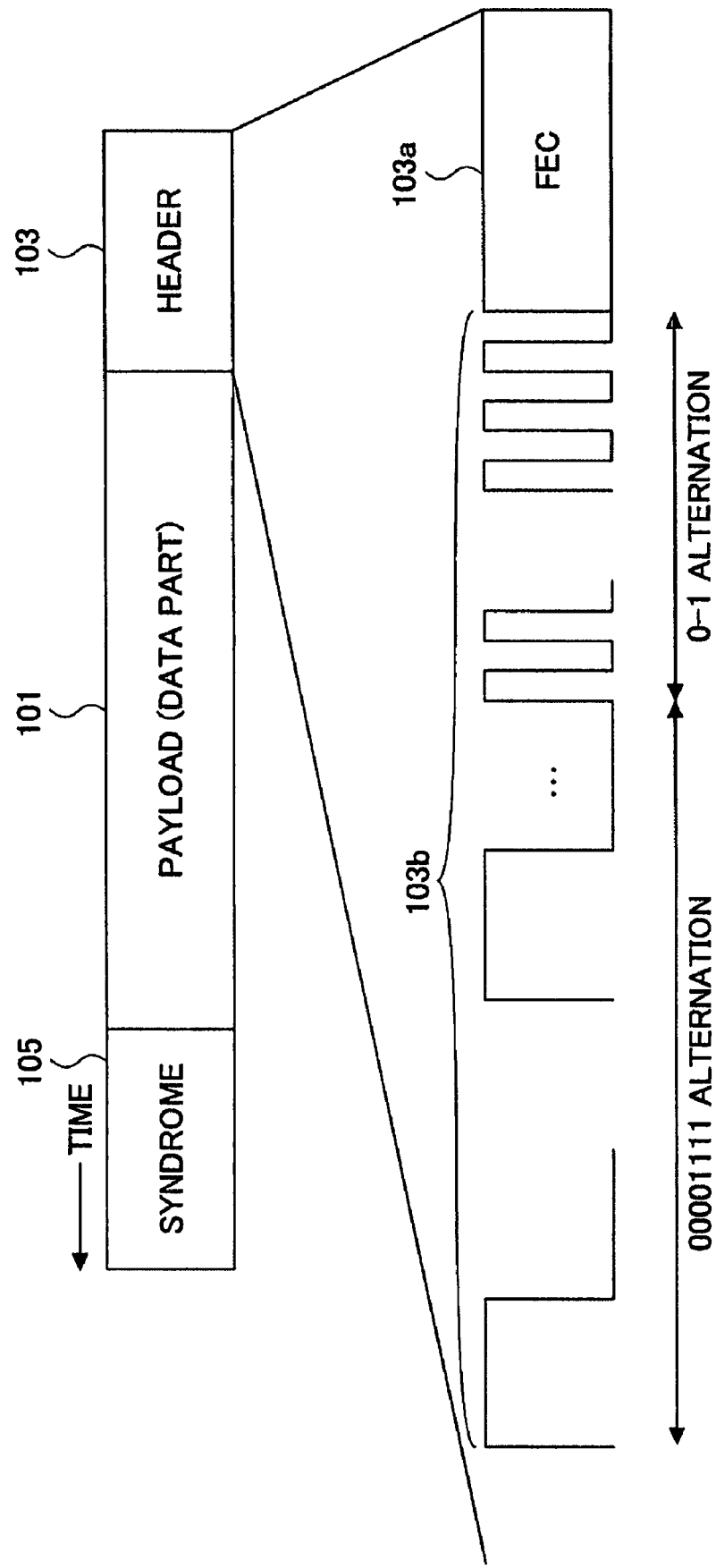
FIG. 11 is a graph showing a frame configuration according to the first embodiment of the present invention.

The error correcting coding part 12 generates FEC information (error correcting information) and a syndrome from client data to be contained in the payload of a frame to be transmitted and the fixed data sequence for dispersion determination to be contained in the header of the frame. Further, the error correcting coding part 12 stores the FEC information and the fixed data sequence for dispersion determination in the header, stores the client data in the payload, and adds the syndrome. Thereby, the error correcting coding part 12 forms a frame as shown in FIG. 11, and feeds the frame to the transmitting part 14.

The alternating 0 series-1 series data do not have to be inserted into a single frame. The 0-series data and the 1-series data may be inserted into alternate frames.

The transmitting part 14 converts the frame from an electrical signal into a light signal, and outputs the light signal to the transmission path 20. The light signal transmitted through the transmission path 20 is fed to the receiver 30 through the tunable dispersion compensator 22.

The receiver 30 includes a receiving part 31, an error correcting decoding part 32, a transmitting part 38, and a dispersion compensation control part 40. The receiving part 31 receives the light signal from the tunable dispersion compensator 22, converts the received light signal into an electrical signal, and feeds the electrical signal to the error correcting decoding part 32.

The error correcting decoding part 32 includes a fixed data separating part 34, an error correcting part 35, and an error counter 36. The fixed data separating part 34 separates the fixed data sequence for dispersion determination (before error correction) from the header of the frame, and feeds the fixed data sequence to the dispersion compensation control part 40.

The error correcting part 35 extracts the FEC information and the syndrome from the frame to perform error detection on the entire frame, and corrects detected errors. Then, the error correcting part 35 extracts the client data from the payload of the frame, and feeds the extracted client data to the transmitting part 38. The error counter 36 counts the number of detected errors, and feeds the error count (value) to the dispersion compensation control part 40.

The transmitting part 38 converts the client data from an electrical signal into a light signal, and outputs the light signal from a client-side interface.

Figure 12:
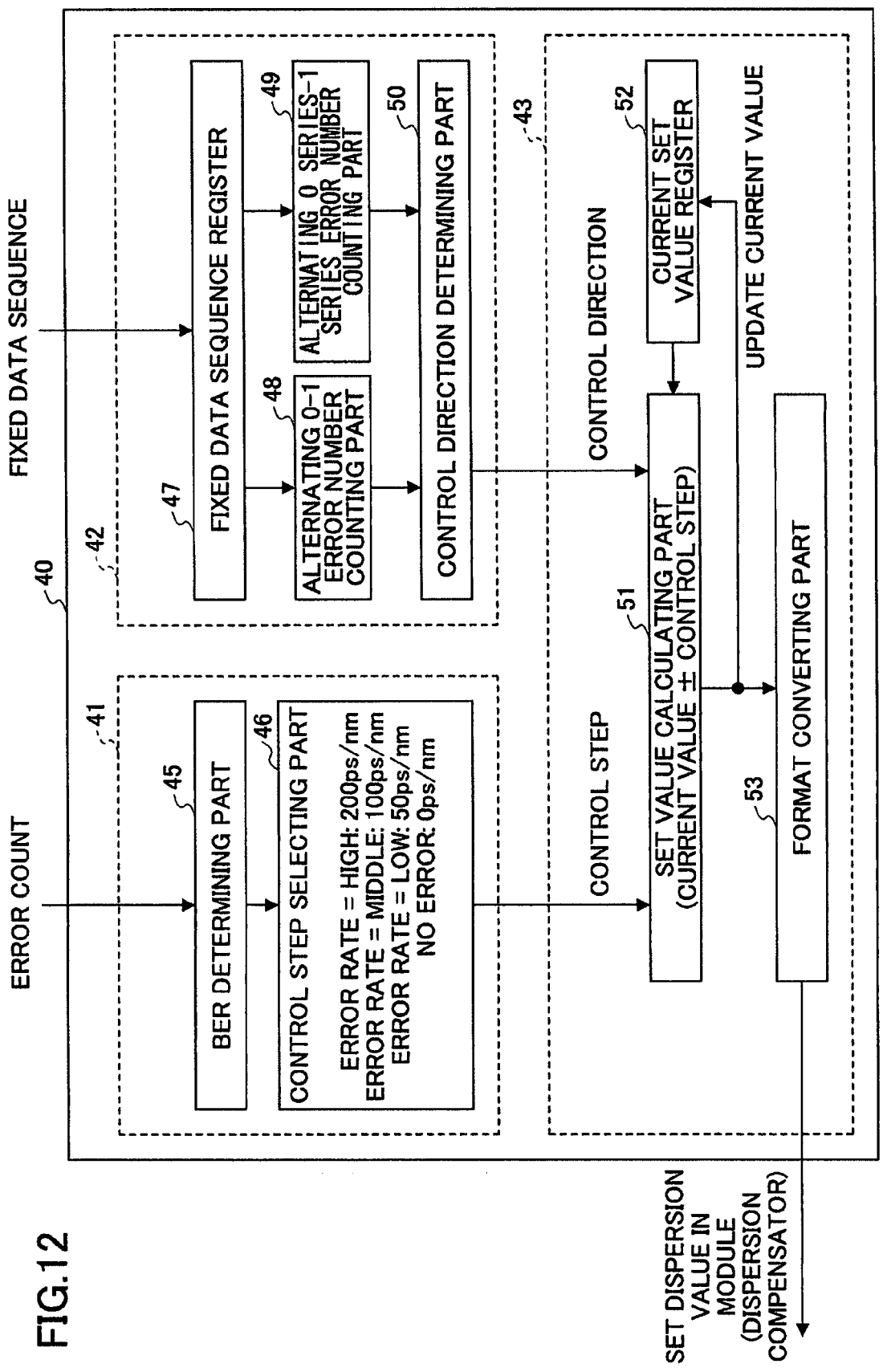
FIG. 12 is a block diagram showing an embodiment of a dispersion compensation control part according to the first embodiment of the present invention.

FIG. 12 is a block diagram showing an embodiment of the dispersion compensation control part 40. Referring to FIG. 12, the dispersion compensation control part 40 includes a dispersion compensation control step selecting part 41, a dispersion compensation control direction determining part 42, and a control executing part 43 (a control part).

The dispersion compensation control step selecting part 41 includes a BER (Bit Error Rate) determining part 45 and a control step selecting part 46. The BER determining part 45 converts the error count fed from the error counter 36 into BER. Then, the BER determining part 45 compares this BER with each of 0, a threshold of $10^{-8}$, and a threshold of $10^{-5}$, and feeds the comparison results to the control step selecting part 46.

In the case of BER=0, the control step selecting part 46 selects a control step of 0 ps/nm. In the case of $0<BER\leq10^{-8}$, the control step selecting part 46 selects a control step of 50 ps/nm. In the case of $10^{-8}<BER\leq10^{-5}$, the control step selecting part 46 selects a control step of 100 ps/nm. In the case of $10^{-5}<BER$, the control step selecting part 46 selects a control step of 200 ps/nm. Then, the control step selecting part 46 notifies the control executing part 43 of the selected control step. The control step is thus varied step by step in order to simplify control. Alternatively, the control step may be varied continuously or successively in proportion to BER.

Most of the current WDM (Wavelength Division Multiplexing) apparatuses set an optimum dispersion by combining multiple dispersion compensation fibers having different lengths (that is, different amounts of dispersion compensation), and a dispersion compensation fiber used for fine adjustment has a minimum dispersion compensation of 50 ps/nm. Accordingly, there is no problem in that the tunable dispersion compensator 22 has a minimum step amount of dispersion compensation control of 50 ps/nm.

Further, it is possible to significantly improve the error characteristic by error correction at the receiver end, but it is not always necessary to reduce residual dispersion to a minimum value with accuracy. Therefore, if BER is less than or equal to a predetermined threshold greater than or equal to zero, the control step may be set to 0 ps/nm to stop variably controlling dispersion compensation.

The dispersion compensation control direction determining part 42 includes a fixed data sequence register 47, an alternating 0-1 error number counting part 48, an alternating 0 series-1 series error number counting part 49, and a control direction determining part 50 (an increase/decrease direction determining part).

The fixed data sequence register 47 stores the fixed data sequence fed from the fixed data sequence separating part 34. The fixed data sequence register 47 feeds the alternating 0-1 data in the fixed data sequence to the alternating 0-1 error number counting part 48, and feeds the alternating 0 series-1 series data in the fixed data sequence to the alternating 0 series-1 series error number counting part 49.

The alternating 0-1 error number counting part 48 counts the number of errors by comparing the alternating 0-1 data with a known data pattern (01010101), and feeds the counted number of errors to the control direction determining part 50. The alternating 0 series-1 series error number counting part 49 counts the number of errors by comparing the alternating 0 series-1 series data with a known data pattern (00001111), and feeds the counted number of errors to the control direction determining part 50.

The control direction determining part 50 compares the number of errors of the alternating 0 series-1 series error number counting part 49 with a predetermined threshold X. If the number of errors of the alternating 0 series-1 series error number counting part 49 is greater than the predetermined threshold X, the eye penalty is degraded. Accordingly, the control direction determining part 50 compares the number of errors of the alternating 0-1 error number counting part 48 with a predetermined threshold Y. If the number of errors of the alternating 0-1 error number counting part 48 is greater than the predetermined threshold Y, the phase margin is degraded. Accordingly, the control direction determining part 50 determines that this is the state of Residual Dispersion A of FIG. 6, and determines the direction to increase dispersion compensation as the direction of control (control direction), so as to feed a value "+1" to the control executing part 43. A description is given below of the above-described predetermined values X and Y.

On the other hand, if the number of errors of the alternating 0-1 error number counting part 48 is less than or equal to the predetermined threshold Y, the phase margin is satisfactory. Accordingly, the control direction determining part 50 determines that this is the state of Residual Dispersion E of FIG. 6, and determines the direction to decrease dispersion compensation as the direction of control, so as to feed a value "−1" to the control executing part 43.

If the number of errors of the alternating 0 series-1 series error number counting part 49 is less than or equal to the predetermined threshold X, the eye penalty is satisfactory. Accordingly, the control direction determining part 50 outputs a value "0" to the control executing part 43 in order to stop variably controlling dispersion compensation.

The control executing part 43 includes a set value calculating part 51, a current set value register 52, and a format converting part 53.

The set value calculation part 51 is fed with a control step from the dispersion compensation control step selecting part 41, a value (−1, 0, or +1) indicating the direction of control from the dispersion compensation control direction determining part 42, and a current value of dispersion compensation from the current set value register 52, and calculates a new set value (=[current value]+[value indicating the direction of control]×[control step]). This new set value is fed to the format converting part 53, and is also fed to the current set value register 52 to update the set value.

The format converting part 53 converts the new set value of dispersion compensation into the control signal format of the tunable dispersion compensator 22 (FIG. 10), and feeds the converted new set value to the tunable dispersion compensator 22.

Here, since the blank area 103*b* of the header 103, which is available to a user, is limited, a single frame may not be sufficient to determine the tendency of error occurrence. In this case, the number of errors of the fixed data part may be counted over multiple frames. Since the change in the amount of dispersion of the optical fiber of the transmission path 20 is gradual, it causes no problem to control the amount of dispersion compensation on the order of a few seconds or more. It causes no characteristics problems to collect the data of multiple frames.

Here, the predetermined thresholds X and Y are determined based on transmission rate and BER for determining error occurrence. In FEC frames, the minimum unit of one frame is 1020 bytes (=8160 bits). For example, the transmission rate of FEC frames of SONET (Synchronous Optical Network) is 10.709 Gbps. Therefore, 1,312,377 frames are transmitted per second. The blank area of a header that can be used by a user in one frame, which may slightly differ in size depending on the specifications of an apparatus, is approximately 64 bytes (=512 bits), so that it is possible to use approximately $6.7 \times 10^8$ bits per second as a fixed data sequence for dispersion determination.

At a transmission rate of 10 Gbps, one bit of error per second causes BER to be $10^{-10}$. It is assumed that a BER threshold for determining error occurrence is $10^{-8}$. Since it is possible to use approximately $6.7 \times 10^8$ bits per second as a fixed data sequence for dispersion determination, BER is considered to be approximately $10^{-8}$ if ten bits of error are detected per second in the fixed data sequence for dispersion determination.

Therefore, in the case of inserting each of the alternating 0-1 data and the alternating 0 series-1 series data for one second in the fixed data sequence for dispersion determination, a value corresponding to 10 bits per second is set as each of the predetermined thresholds X and Y. Alternatively, a value corresponding to 100 bits per ten seconds may be set. In the case of other rates (for example, 11,096 Mbps of 10 Gb Ethernet [registered trademark]), values corresponding to the rates are set.

Different values may be set for the predetermined threshold X for determining eye penalty degradation and the predetermined threshold Y for determining phase margin degradation.

Second Embodiment

Figure 13:
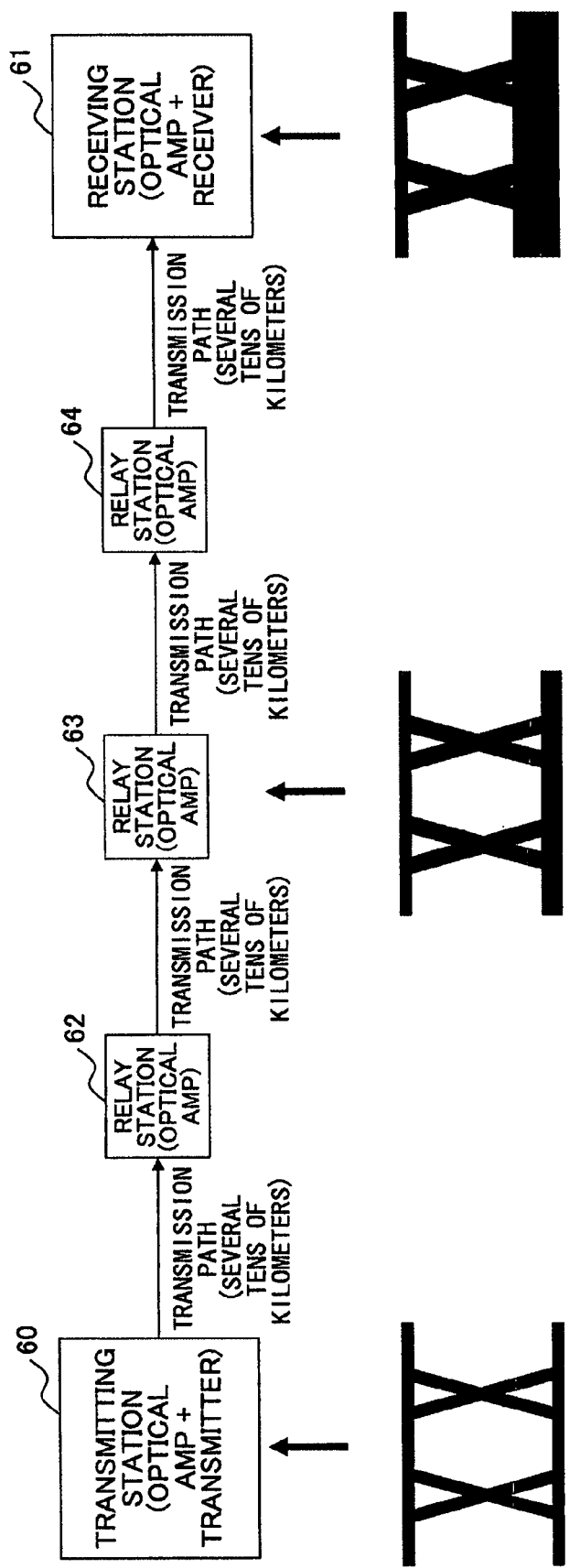
FIG. 13 is a diagram showing a long distance transmission system according to a second embodiment of the present invention.
Figure 14:
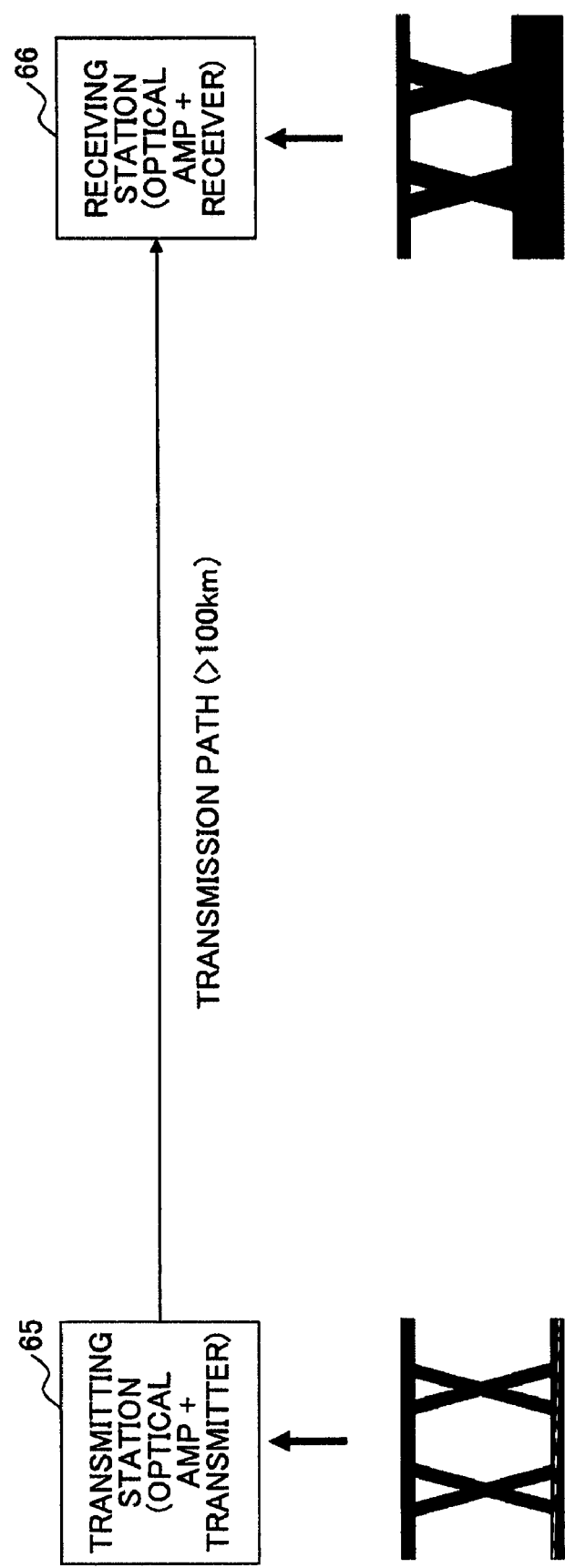
FIG. 14 is a diagram showing another long distance transmission system according to the second embodiment of the present invention.

As shown in FIG. 13, there is a long distance transmission system having relay stations 62, 63, and 64, each including an optical amplifier (optical AMP), connected in multiple stages between a transmitting station 60 and a receiving station 61 each having a built-in optical amplifier. There is also a long distance transmission system where a single span transmission between a transmitting station 65 and a receiving station 66 each having a built-in optical amplifier exceeds 100 km as shown in FIG. 14.

Such long distance transmission systems are affected by ASE (Amplified Spontaneous Emission) noise due to optical amplifiers. Therefore, as shown in eye patterns below the transmitting station 60, the relay station 63, and the receiving station 61 of FIG. 13 and the transmitting station 65 and the receiving station 66 of FIG. 14, there occurs the error that the receiving stations 61 and 66 misread a signal "0" as a signal "1" because of degradation of OSNR (Optical Signal-to-Noise Ratio) due to long distance transmission.

In this case, the error due to OSNR degradation also occurs in the above-described alternating 0-1 data and alternating 0 series-1 series data. Therefore, there may be a mistake in identifying a correct control direction. Accordingly, 0-series data of "00000000 . . . " are set in the blank area of the header of a frame, and the effect of OSNR is determined by counting the number of errors in that portion.

The error that occurs in the 0-series data is purely caused by OSNR degradation, and the error due to OSNR degradation should also occur in the alternating 0-1 data and the alternating 0 series-1 series data at substantially the same rate. Accordingly, in a system with concern for OSNR degradation, the results excluding the error due to OSNR degradation can be obtained by subtracting the number of errors in the 0-series data from the number of errors in the alternating 0-1 data and from the number of errors in the alternating 0 series-1 series data.

As described above, it is when there is concern for OSNR degradation due to optical amplifiers that the 0-series data are written into the blank area of a header. Even if a system is configured to include an optical amplifier, there is no need to store 0-series data if OSNR is sufficiently acceptable in terms of design.

Accordingly, whether to store 0-series data may be determined based on the setting of the transmitter 10 (FIG. 10). If the setting is such that 0-series data are to be stored, the fixed data sequence generating part 13 generates alternating 0-1 data, alternating 0 series-1 series data, and 0-series data as a fixed data sequence for dispersion determination. The error correcting coding part 12, for example, sets the alternating 0-1 data and the alternating 0 series-1 series data in a frame of an odd number and sets the 0-series data in a frame of an even number.

If the setting is such that no 0-series data are to be stored, the fixed data sequence generating part 13 generates alternating 0-1 data and alternating 0 series-1 series data during a period of generation of 0-series data, and the error correcting coding part 12 sets the alternating 0-1 data and the alternating 0 series-1 series data in the header of each frame.

Figure 15:
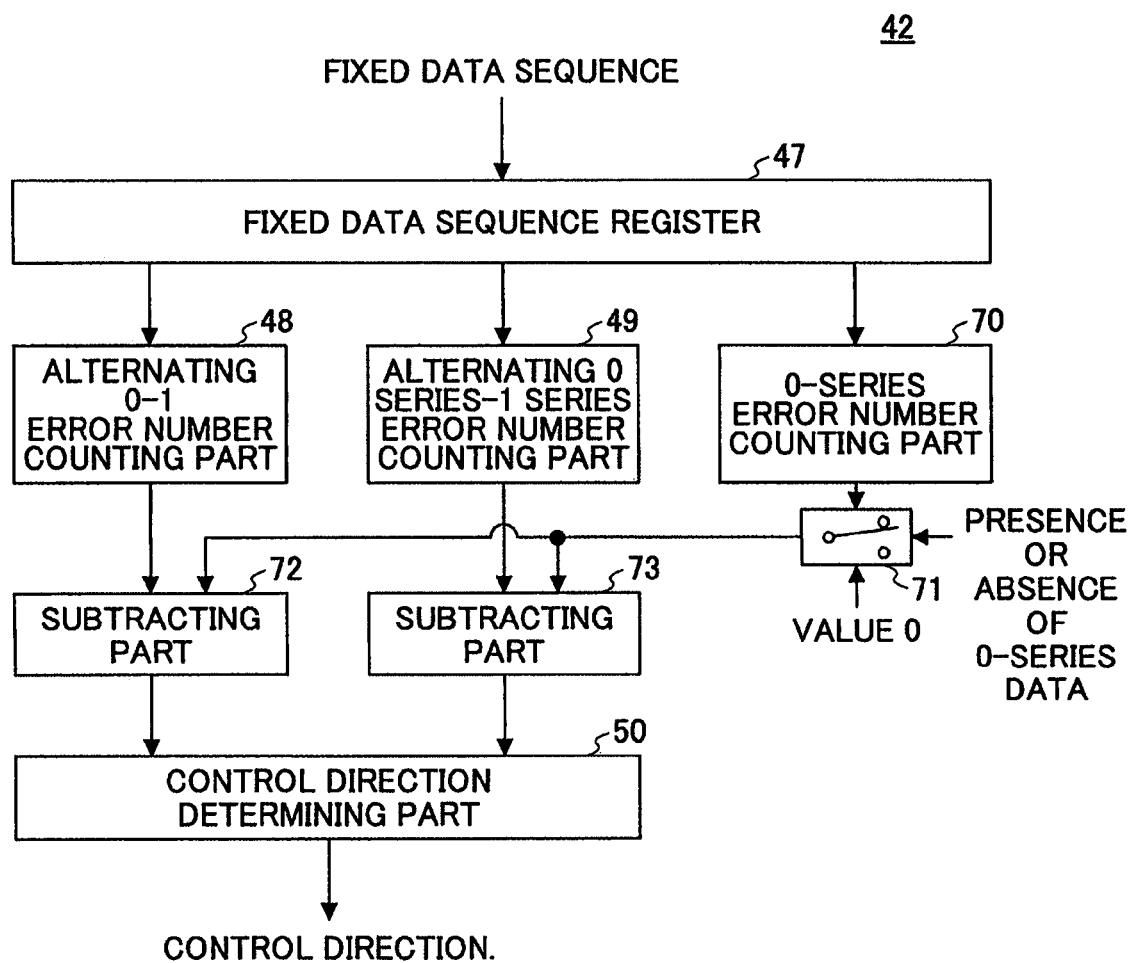
FIG. 15 is a block diagram showing a configuration of a dispersion compensation control direction determining part for implementing the second embodiment of the present invention.

FIG. 15 is a block diagram showing a configuration of the dispersion compensation control direction determining part 42 for implementing a second embodiment of the present invention. In FIG. 15, the same elements as those of FIG. 12 are referred to by the same numerals.

Referring to FIG. 15, the fixed data sequence register 47 stores fixed data sequences fed from the fixed data sequence separating part 34. Then, the fixed data sequence register 47 feeds the alternating 0-1 data in the fixed data sequence of an odd-number frame to the alternating 0-1 error number counting part 48, feeds the alternating 0 series-1 series data in the fixed data sequence of the odd-number frame to the alternating 0 series-1 series error number counting part 49, and feeds the 0-series data in the fixed data sequence of an even-number frame to a 0-series error number counting part 70.

The alternating 0-1 error number counting part 48 counts the number of errors by comparing the alternating 0-1 data with a known data pattern (01010101), and feeds the counted number of errors to a subtracting part 72. The alternating 0 series-1 series error number counting part 49 counts the number of errors by comparing the alternating 0 series-1 series data with a known data pattern (00001111), and feeds the counted number of errors to a subtracting part 73. The 0-series error number counting part 70 counts the number of errors (that is, the number of 1s) by comparing the 0-series data with a known data pattern (all 0 data), and feeds the counted number of errors to one input terminal of a switch 71 (a switch part).

A value "0" is fed to the other input terminal of the switch 71, and a control signal to set the presence or absence of 0-series data is fed to the control terminal of the switch 71. If the control signal indicates the presence of 0-series data, the switch 71 selects the number of errors output by the 0-series error number counting part 70, and feeds the number of errors to the subtracting parts 72 and 73. If the control signal indicates the absence of 0-series data, the switch 71 selects the value "0," and feeds the value "0" to the subtracting parts 72 and 73. Each of the subtracting parts 72 and 73 subtracts the value fed from the switch 71 from the number of errors fed from a corresponding one of the error number counting parts 48 and 49, and feeds the result of the subtraction to the control direction determining part 50.

As a result, if there are O-series data, the number of errors in the alternating 0-1 data and the number of errors in the alternating 0 series-1 series data each excluding the number of errors due to OSNR degradation are fed to the control direction determining part 50. If the number of bits of the 0-series data is equal to the number of bits of each of the alternating 0-1 data and the alternating 0 series-1 series data, the 0-series error number counting part 70 directly feeds the counted number of errors to the switch 71. On the other hand, if the ratio of the number of bits of each of the alternating 0-1 data and the alternating 0 series-1 series data to the number of bits of the 0-series data is m:n, the 0-series error number counting part 70 multiplies the counted number of errors by m/n, and feeds the multiplied number of errors to the switch 71.

The control direction determining part 50 compares the number of errors of the alternating 0 series-1 series error number counting part 49 with a predetermined threshold. If the number of errors of the alternating 0 series-1 series error number counting part 49 is greater than the predetermined threshold, the eye penalty is degraded. Accordingly, the control direction determining part 50 compares the number of errors of the alternating 0-1 error number counting part 48 with a predetermined threshold. If the number of errors of the alternating 0-1 error number counting part 48 is greater than the predetermined threshold, the phase margin is degraded. Accordingly, the control direction determining part 50 determines that this is the state of Residual Dispersion A of FIG. 6, and determines the direction to increase dispersion compensation as the direction of control (control direction), so as to feed a value "+1" to the control executing part 43.

On the other hand, if the number of errors of the alternating 0-1 error number counting part 48 is less than or equal to the predetermined threshold, the phase margin is satisfactory. Accordingly, the control direction determining part 50 determines that this is the state of Residual Dispersion E of FIG. 6, and determines the direction to decrease dispersion compensation as the direction of control, so as to feed a value "−1" to the control executing part 43.

If the number of errors of the alternating 0 series-1 series error number counting part 49 is less than or equal to the predetermined threshold, the eye penalty is satisfactory. Accordingly, the control direction determining part 50 outputs a value "0" to the control executing part 43 in order to stop variably controlling dispersion compensation.

In the second embodiment, the control direction determining part 50 and the subtracting parts 72 and 73 may form an increase/decrease direction determining part.

Thus, according to embodiments of the present invention, it is possible to optimally vary the amount of dispersion compensation without concern that varying the amount of dispersion compensation may prevent errors from being corrected.

The present invention is not limited to the specifically disclosed embodiments, and variations and modifications may be made without departing from the scope of the present invention.

What is claimed is:

1. A chromatic dispersion compensation control method compensating for a chromatic dispersion of an optical transmission path with a variable dispersion compensator inserted in the optical transmission path, the chromatic dispersion compensation control method comprising:

a transmitter inserting a fixed data sequence in a rewritable area of a transmission data sequence to be transmitted and transmitting the transmission data sequence to the optical transmission path, the fixed data sequence containing alternating 0-1 data formed of alternating 0s and 1s and alternating 0 series-1 series data formed of alternating series of 0s and 1s; and a receiver determining a direction to increase or decrease a dispersion compensation of the variable dispersion compensator based on a number of error occurrences in the alternating 0-1 data of the fixed data sequence and a number of error occurrences in the alternating 0 series-1 series data of the fixed data sequence, and variably controlling the dispersion compensation of the variable dispersion compensator in accordance with the determined direction.

2. The chromatic dispersion compensation control method as claimed in claim 1, wherein 0-series data formed of a series of 0s are further included in the fixed data sequence in the transmitter; and the direction to increase or decrease the dispersion compensation of the variable dispersion compensator is determined based on a value obtained by subtracting a value corresponding to a number of error occurrences in the 0-series data of the fixed data sequence from the number of error occurrences in the alternating 0-1 data of the fixed data sequence and on a value obtained by subtracting the value corresponding to the number of error occurrences in the 0-series data of the fixed data sequence from the number of error occurrences in the alternating 0 series-1 series data of the fixed data sequence in the receiver.

3. A transmitter for use in a chromatic dispersion compensation control method compensating for a chromatic dispersion of an optical transmission path with a variable dispersion compensator inserted in the optical transmission path, the transmitter comprising:

a fixed data sequence generating part configured to generate a fixed data sequence containing alternating 0-1 data formed of alternating 0s and 1s and alternating 0 series-1 series data formed of alternating series of 0s and 1s; and a fixed data sequence inserting part configured to insert the fixed data sequence in a rewritable area of a transmission data sequence to be transmitted, and to transmit the transmission data sequence to the optical transmission path.

4. The transmitter as claimed in claim 3, wherein the fixed data sequence inserting part is further configured to divide the fixed data sequence into a plurality of portions, and to insert the portions in rewritable areas of a plurality of transmission data sequences.

5. A receiver for use in a chromatic dispersion compensation control method compensating for a chromatic dispersion of an optical transmission path with a variable dispersion compensator inserted in the optical transmission path, the receiver comprising:
    an alternating 0-1 data error number counting part configured to count a number of error occurrences in alternating 0-1 data of a fixed data sequence inserted in a rewritable area of a transmission data sequence in a transmitter, the fixed data sequence containing the alternating 0-1 data formed of alternating 0s and 1s and alternating 0 series -1 series data formed of alternating series of 0s and 1s;
    an alternating 0 series-1 series error number counting part configured to count a number of errors in the alternating 0 series-1 series data of the fixed data sequence;
    an increase/decrease direction determining part configured to determine a direction to increase or decrease a dispersion compensation of the variable dispersion compensator based on the number of error occurrences in the alternating 0-1 data and the number of error occurrences in the alternating 0 series-1 series data; and
    a control part configured to variably control the dispersion compensation of the variable dispersion compensator in accordance with the determined direction.

6. The receiver as claimed in claim 5, wherein the alternating 0-1 error number counting part is configured to count the number of error occurrences in the alternating 0-1 data divided and inserted into rewritable areas of a plurality of transmission data sequences; and
    the alternating 0 series-1 series error number counting part is configured to count the number of error occurrences in the alternating 0 series-1 series data divided and inserted into rewritable areas of a plurality of transmission data sequences.

7. The receiver as claimed in claim 5, wherein the control part is configured to variably control the dispersion compensation of the variable dispersion compensator with control steps of successive values proportional to error rates.

8. The receiver as claimed in claim 5, wherein the control part is configured to variably control the dispersion compensation of the variable dispersion compensator with control steps of stepwise values proportional to error rates.

9. The receiver as claimed in claim 5, wherein the control part is configured to stop variably controlling the dispersion compensation of the variable dispersion compensator in response to an error rate being less than or equal to a predetermined threshold.

10. The receiver as claimed in claim 5, wherein the control part is configured to stop variably controlling the dispersion compensation of the variable dispersion compensator in response to the number of error occurrences in the alternating 0 series-1 series data being less than or equal to a predetermined threshold.

11. A transmitter for use in a chromatic dispersion compensation control method compensating for a chromatic dispersion of an optical transmission path with a variable dispersion compensator inserted in the optical transmission path, the transmitter comprising:
    a fixed data sequence generating part configured to generate a fixed data sequence containing alternating 0-1 data formed of alternating 0s and 1s, alternating 0 series-1 series data formed of alternating series of 0s and 1s, and 0-series data formed of a series of 0s; and
    a fixed data sequence inserting part configured to insert the fixed data sequence in a rewritable area of a transmission data sequence to be transmitted, and to transmit the transmission data sequence to the optical transmission path.

12. The transmitter as claimed in claim 11, wherein the fixed data sequence generating part is configured to generate the fixed data sequence so that the fixed data sequence is one of a first fixed data sequence and a second fixed data sequence in accordance with a setting of the transmitter, the first fixed data sequence being formed of the alternating 0-1 data, the alternating 0 series-1 series data, and the 0-series data and the second fixed data sequence being formed of the alternating 0-1 data and the alternating 0 series-1 series data.

13. The transmitter as claimed in claim 11, wherein the fixed data sequence inserting part is further configured to divide the fixed data sequence into a plurality of portions, and to insert the portions in rewritable areas of a plurality of transmission data sequences.

14. A receiver for use in a chromatic dispersion compensation control method compensating for a chromatic dispersion of an optical transmission path with a variable dispersion compensator inserted in the optical transmission path, the receiver comprising:
    an alternating 0-1 data error number counting part configured to count a number of error occurrences in alternating 0-1 data of a fixed data sequence inserted in a rewritable area of a transmission data sequence in a transmitter, the fixed data sequence containing the alternating 0-1 data formed of alternating 0s and 1s, alternating 0 series-1 series data formed of alternating series of 0s and 1s, and 0-series data formed of a series of 0s;
    an alternating 0 series-1 series error number counting part configured to count a number of errors in the alternating 0 series-1 series data of the fixed data sequence;
    a 0-series error number counting part configured to count a number of errors in the 0-series data of the fixed data sequence;
    an increase/decrease direction determining part configured to determine a direction to increase or decrease a dispersion compensation of the variable dispersion compensator based on a value obtained by subtracting a value corresponding to the number of error occurrences in the 0-series data from the number of error occurrences in the alternating 0-1 data and on a value obtained by subtracting the value corresponding to the number of error occurrences in the 0-series data from the number of error occurrences in the alternating 0 series-1 series data; and
    a control part configured to variably control the dispersion compensation of the variable dispersion compensator in accordance with the determined direction.

15. The receiver as claimed in claim 14, further comprising:
    a switch part configured to feed the number of error occurrences in the 0-series data counted in the 0-series error number counting part to the increase/decrease direction determining part in response to the fixed data sequence being a first fixed data sequence formed of the alternating 0-1 data, the alternating 0 series-1 series data, and the 0-series data, and to determine the number of error occurrences in the 0-series data as zero and feed the number of error occurrences to the increase/decrease direction determining part in response to the fixed data sequence being a second fixed data sequence formed of the alternating 0-1 data and the alternating 0 series-1 series data.

16. The receiver as claimed in claim 14, wherein the alternating 0-1 error number counting part is configured to count the number of errors in the alternating 0-1 data divided and inserted into rewritable areas of a plurality of transmission data sequences;
- the alternating 0 series-1 series error number counting part is configured to count the number of errors in the alternating 0 series-1 series data divided and inserted into rewritable areas of a plurality of transmission data sequences; and
- the 0-series error number counting part is configured to count the number of errors in the 0-series data divided and inserted into rewritable areas of a plurality of transmission data sequences.

17. The receiver as claimed in claim 14, wherein the control part is configured to variably control the dispersion compensation of the variable dispersion compensator with control steps of successive values proportional to error rates.

18. The receiver as claimed in claim 14, wherein the control part is configured to variably control the dispersion compensation of the variable dispersion compensator with control steps of stepwise values proportional to error rates.

19. The receiver as claimed in claim 14, wherein the control part is configured to stop variably controlling the dispersion compensation of the variable dispersion compensator in response to an error rate being less than or equal to a predetermined threshold.

20. The receiver as claimed in claim 14, wherein the control part is configured to stop variably controlling the dispersion compensation of the variable dispersion compensator in response to the number of error occurrences in the alternating 0 series-1 series data being less than or equal to a predetermined threshold.

* * * * *